W. N. Abbott,
Pipe Coupling,
№ 46,603, Patented Feb. 28, 1865.

Witnesses
N. W. Stearns
H. E. Teschemacher

Inventor
Warren N. Abbott

UNITED STATES PATENT OFFICE.

WARREN N. ABBOTT, OF BOSTON, MASSACHUSETTS, ASSIGNOR TO HIMSELF AND DWIGHT B. RICH, OF THE SAME PLACE.

IMPROVEMENT IN PIPE-COUPLINGS.

Specification forming part of Letters Patent No. 46,603, dated February 28, 1865.

*To all whom it may concern:*

Be it known that I, WARREN N. ABBOTT, of Boston, in the county of Suffolk and State of Massachusetts, have invented an Improved Pipe-Coupling, of which the following is a full, clear, and exact description, reference being had to the accompanying drawings, making part of this specification, in which—

Figure 1:
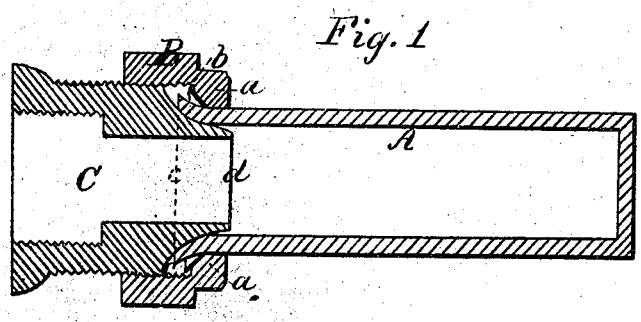
Figure 3:
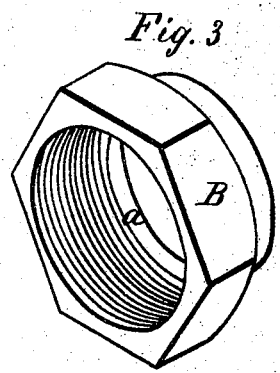
Figure 2:
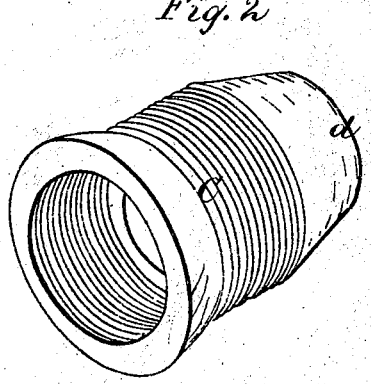
Figure 4:
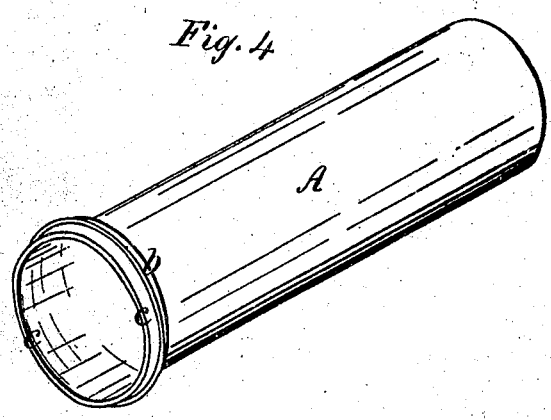

Figure 1 is a section through my improved coupling, showing the manner in which the pipe is attached thereto. Figs. 2 and 3 are views of the two portions of the coupling detached. Fig. 4 is a view of a piece of lead pipe having its end slightly enlarged, so as to fit over the conical end of the coupling.

The ordinary method of connecting couplings to lead pipes is by means of a joint of solder, the forming of which requires considerable time, and the joint is both clumsy and expensive.

My invention has for its object to overcome these difficulties and to produce a coupling by means of which a pipe can readily be attached or pieced at any desired point without the use of solder; and it consists in a detachable screw coupling in which the end of the pipe is confined between the two portions of the coupling and compressed tightly in place, whereby all danger of leakage is prevented.

To enable others skilled in the art to understand and use my invention, I will proceed to describe the manner in which I have carried it out.

In the said drawings, A represents a lead pipe, over which is slipped a screw-nut, B, provided with a flange, a, and a washer, b, is also placed over the end of the pipe, which is then enlarged or flared out by means of a conical plug or otherwise, as seen in Fig. 4.

C is a nipple, one end, d, of which is made conical and is fitted into the enlarged end c of the pipe A. The nut B is now brought up and screwed onto the nipple C, which is provided with a screw-thread on its exterior surface, the nut B forcing the enlarged end c of the pipe A onto the conical end d of the nipple and compressing it tightly on all sides and insuring a perfect joint without the use of solder. The interior of the nipple C is provided with a screw-thread in the ordinary manner, by which the coupling can be attached at any desired point.

The washer b causes the nut B to turn more smoothly on the end of the pipe and prevents it from being twisted as the nut is turned. It may, however, be dispensed with if desired.

The above-described coupling may be employed for a variety of purposes. For instance, when a faucet is to be inserted in some portion of the length of a pipe, both ends of the T-shaped piece, into which the faucet is screwed, are made conical and provided with screw-threads in a manner similar to the nipple C, and a short piece of the pipe being removed, a screw-nut, B, and washer b, are slipped over each end of the pipe where the joints are to be made, and these ends being enlarged or flared out, as seen in Fig. 4, the conical ends of the T-shaped piece are inserted therein and the nuts screwed up into place, thus avoiding the use of solder and effecting a great saving of time and labor.

In the event of a pipe bursting the fractured portion may be cut out and the pipe pieced in a similar manner to that above described.

I have heretofore spoken of my improved screw-coupling as particularly applicable to lead pipes; but it is evident that it is equally applicable to pipes of rubber, gutta-percha, or other soft or flexible material, or to leather hose. It is also cheap and efficient, and can be readily attached or removed.

What I claim as my invention, and desire to secure by Letters Patent, is—

The within-described detachable coupling, in which the end of the pipe is confined between the two portions B and C, in the manner substantially as described.

WARREN N. ABBOTT.

Witnesses:
P. E. TESCHEMACHER,
N. W. STEARNS.